Aug. 12, 1969 P. B. ELLINGER ET AL 3,461,431

HIGH SPEED THIN FILM MEMORY

Filed Nov. 7, 1966 7 Sheets-Sheet 1

INVENTORS
PAUL B. ELLINGER
HIROMU JOHN KUNO

Louis A. Kline
BY John J. Matlago
Richard D. Lengel
THEIR ATTORNEYS

INVENTORS
PAUL B. ELLINGER
HIROMU JOHN KUNO

BY
THEIR ATTORNEYS

HIGH SPEED THIN FILM MEMORY

Filed Nov. 7, 1966 7 Sheets-Sheet 3

INVENTORS
PAUL B. ELLINGER
HIROMU JOHN KUNO

BY

THEIR ATTORNEYS

INVENTORS
PAUL B. ELLINGER
HIROMU JOHN KUNO

BY

THEIR ATTORNEYS

INVENTORS
PAUL B. ELLINGER
HIROMU JOHN KUNO

BY John J. Matlago

THEIR ATTORNEYS

HIGH SPEED THIN FILM MEMORY

Filed Nov. 7, 1966 7 Sheets-Sheet 6

INVENTORS
PAUL B. ELLINGER
HIROMU JOHN KUNO
BY
THEIR ATTORNEYS

Aug. 12, 1969 P. B. ELLINGER ET AL 3,461,431

HIGH SPEED THIN FILM MEMORY

Filed Nov. 7, 1966 7 Sheets-Sheet 7

INVENTORS
PAUL B. ELLINGER
HIROMU JOHN KUNO

BY Louis A. Kline
John J. Matlago
Richard ...

THEIR ATTORNEYS

United States Patent Office 3,461,431
Patented Aug. 12, 1969

3,461,431
HIGH SPEED THIN FILM MEMORY

Paul B. Ellinger, Inglewood, Calif., and Hiromu John Kuno, Kendall Park, N.J., assignors to The National Cash Register Company, Dayton, Ohio, a corporation of Maryland Filed Nov. 7, 1966, Ser. No. 592,530
Int. Cl. G11b *13/00*
U.S. Cl. 340—172.5 13 Claims

ABSTRACT OF THE DISCLOSURE

A high-speed magnetic thin film memory is disclosed comprising a three dimensional array of magnetic rod storage elements inductively coupled to word driver circuitry by solenoidal windings of word lines; each of the rod storage elements comprises a conductor having a circumferential anisotropic magnetic thin film on its surface. Each word line couples a plurality of rods in a row and is connected to a switching transistor, the switching transistors of the word lines in a row being coupled through individual diodes to a common row line which is connected to a constant current source individual to each row and the source includes a transistor/circuit having an inductor as part of its load to satisfy current requirements necessary to drive any selected word line of the row at high speed. A dummy load is connected to the constant current source and selection of the row of word lines affects switching of the constant current source from the dummy load to the row to drive any one of the word lines in the row according to column selection for the memory array by saturation of the switching transistor for the selected word line. Monolithic integrated circuitry including emitter-coupled logic circuits provide differential amplification and threshold detection for sensing digital signal outputs and decoding circuits which are coupled to driver circuits supplying higher power levels for word currents.

The present invention is directed to a magnetic thin film memory and, more particularly, to a memory system providing for operation at high speeds required by many data processing systems.

The rate of processing data and the overall speed of operation of advanced data processing systems are in the megacycle frequencies and are often limited by memory cycle time of the memory therefor. The memory of the present invention provides for storing and accessing data to meet these high speed requirements of data processing systems by the provision of memory operating cycles, each of which requires only a small fraction of a microsecond.

In order to provide this high-speed operation, the memory system of the present invention includes magnetic thin film storage elements and circuits for applying signals to selected portions thereof to change their state by magnetic domain rotation to produce relatively high amplitude sense signals of very short duration. In addition, these circuits provide for both reading and writing operations in each cycle of the memory system. Reading is performed by providing only a single pulse of one polarity. Writing is performed by said single pulse and a continuous digit current of one polarity or the other polarity for storage of data. Because the digit current does not return to zero level, transitions of digit current and digit transients are minimized for faster operation.

Further, high speed operation of the present memory is provided by operation of most transistors in the memory circuits in their active regions. While operating in this manner requires more power than slower operation of transistors in their saturation region, the memory circuits are capable of operating at significantly higher speeds for overall higher speed operation of the memory system.

Accordingly, memory circuit arrangements of the present invention provide relatively high voltages and currents necessary for supplying drive currents to word lines, for example, thereby producing a faster rise time of word current in any selected word line. Also, it has been found that in many instances, monolithic integrated circuits can be effectively employed in the operation of the memory with unexpected advantages over circuits using discrete components. For example, a single type of monolithic integrated circuit "chip" is used in the sense amplifier to provide differential amplification, common mode noise rejection and discrimination of sense signals.

Accordingly, it is an object of the present invention to provide a memory system having the foregoing features and advantages.

Another object of the present invention is to provide improved circuit arrangements capable of producing high frequency operation of magnetic thin film storage elements of a memory.

A further object of the present invention is the provision of circuit arrangements for reducing stray capacitive coupling in the memory to provide faster rise times of drive currents and other signals produced in each memory operating cycle.

Still another object of the present invention is to provide an improved constant current device capable of producing high frequency operation of the memory.

A further object is to provide an improved memory word selection circuitry including a transistor for each word line.

Another object of the present invention is the provision of improved circuits for coupling integrated decoding circuits to driver circuits in the word selection circuits of the memory system.

A further object is to provide a memory sense amplifier circuit providing high speed operation, improved stability, threshold detection, and improved sense amplifier strobing capability at these high speeds.

Still another object of the present invention is to provide an improved magnetic rod memory having one or more of the aforementioned features and advantages.

Other objects and features of the present invention will become apparent to those skilled in the art as the disclosure is made in the following detailed description of a preferred embodiment of the present invention as illustrated in the accompanying sheets of drawings, in which.

Figure 1:
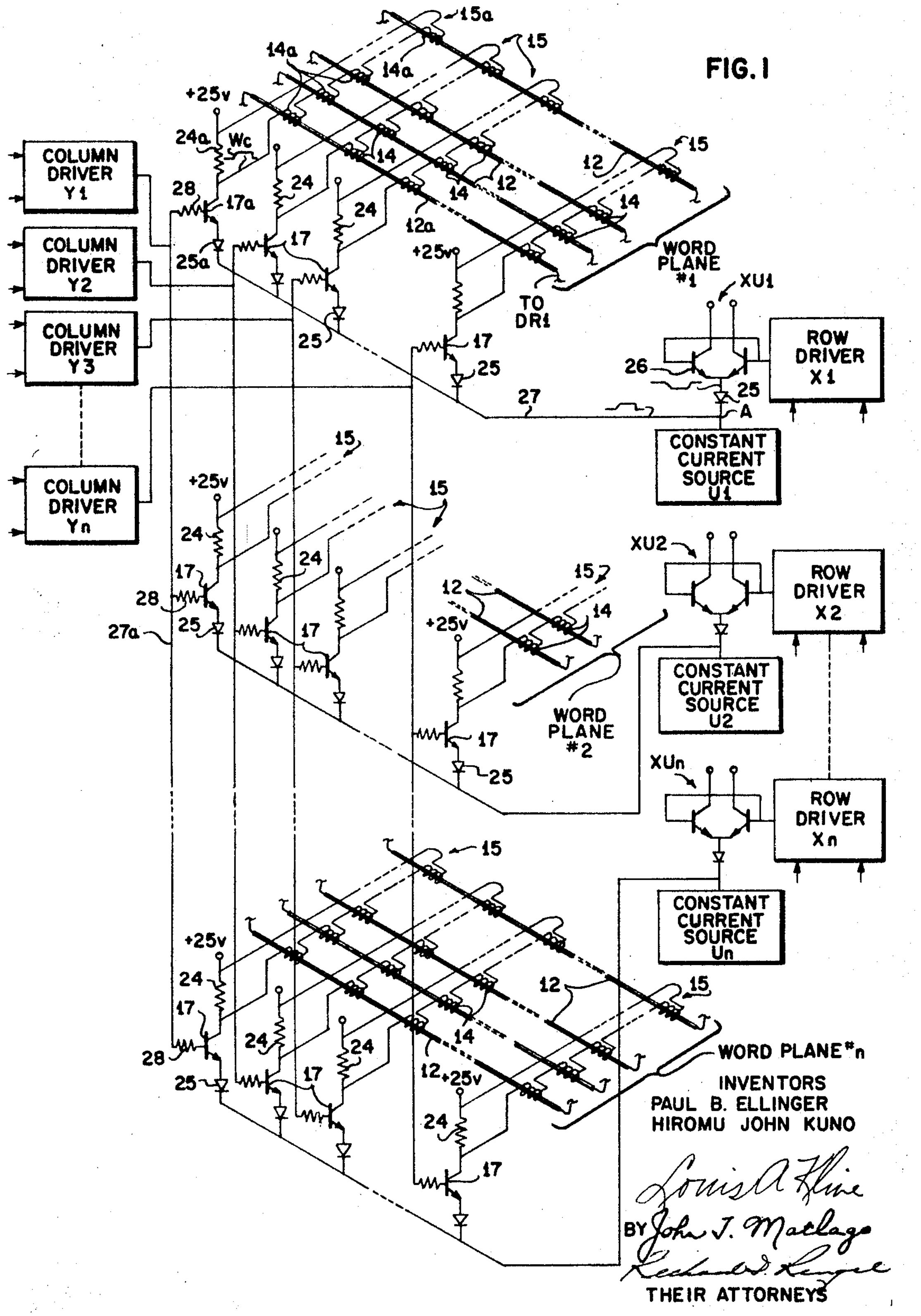
FIG. 1 is a schematic diagram, partly in block diagram, for illustrating the preferred embodiment of the magnetic thin film memory of the present invention.
Figure 3:
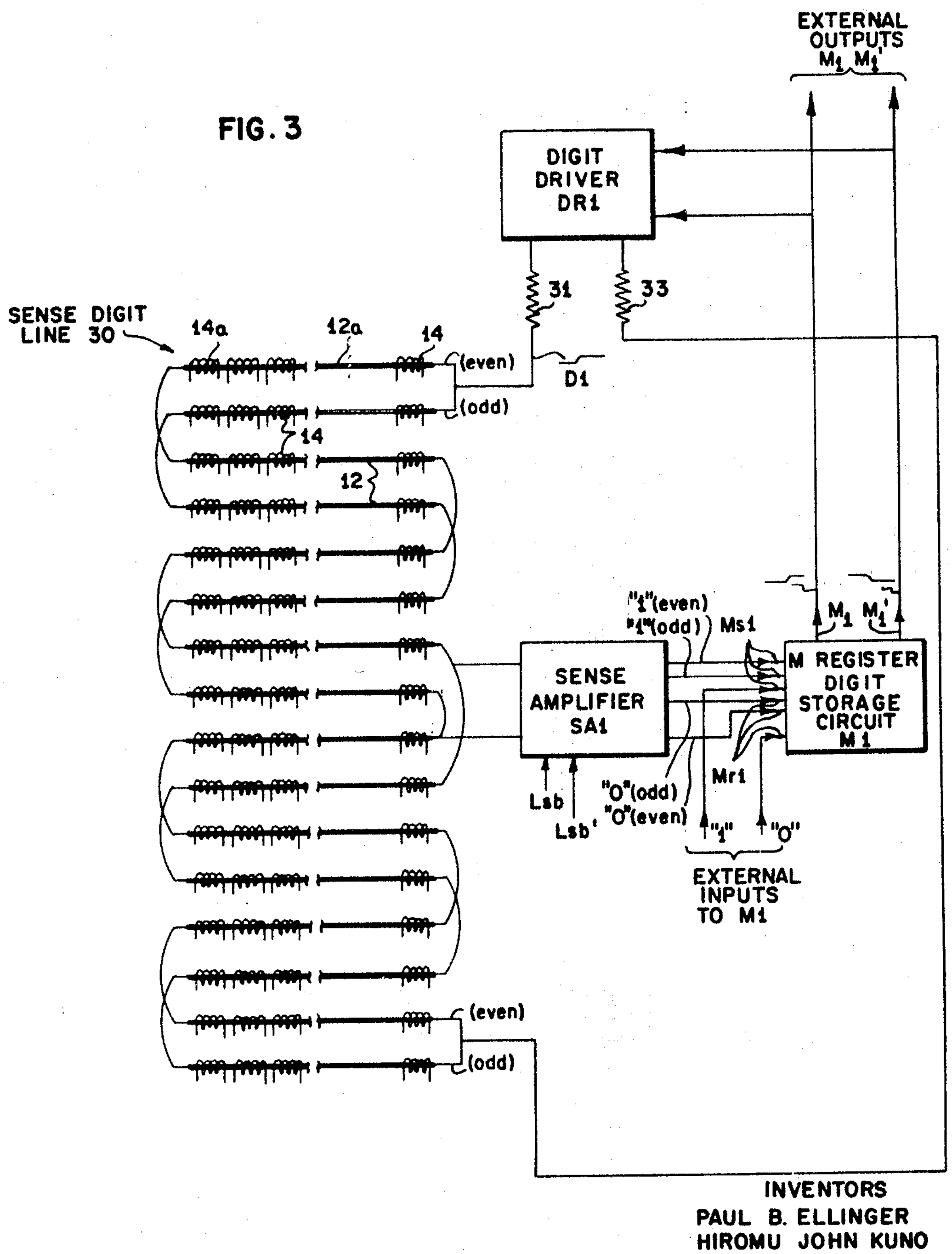
FIG. 3 is a schematic diagram of a sense-digit line and circuits for the first digit positions of the words of the memory shown in FIG. 1.
Figure 3A:
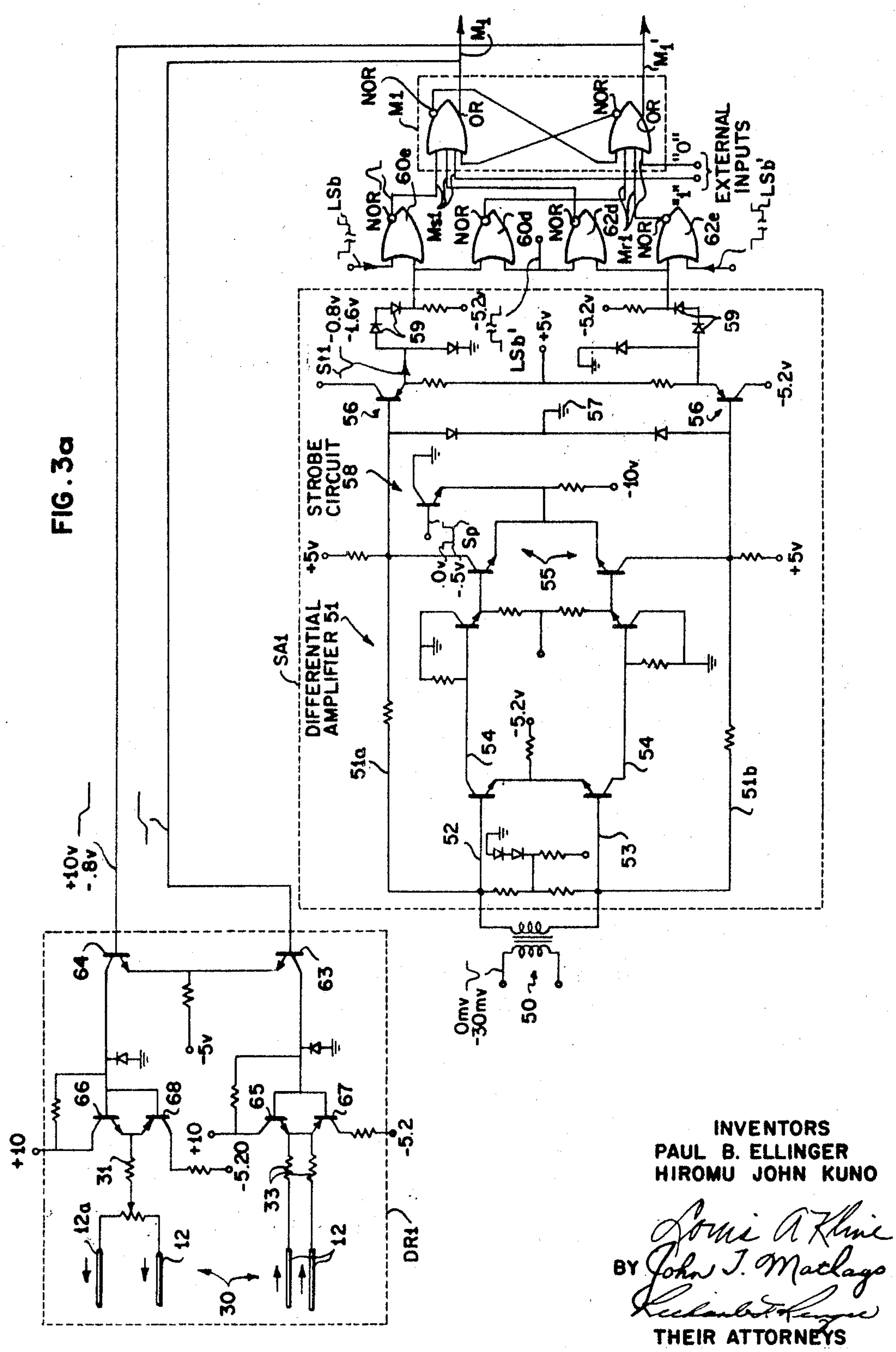
Figure 3B:
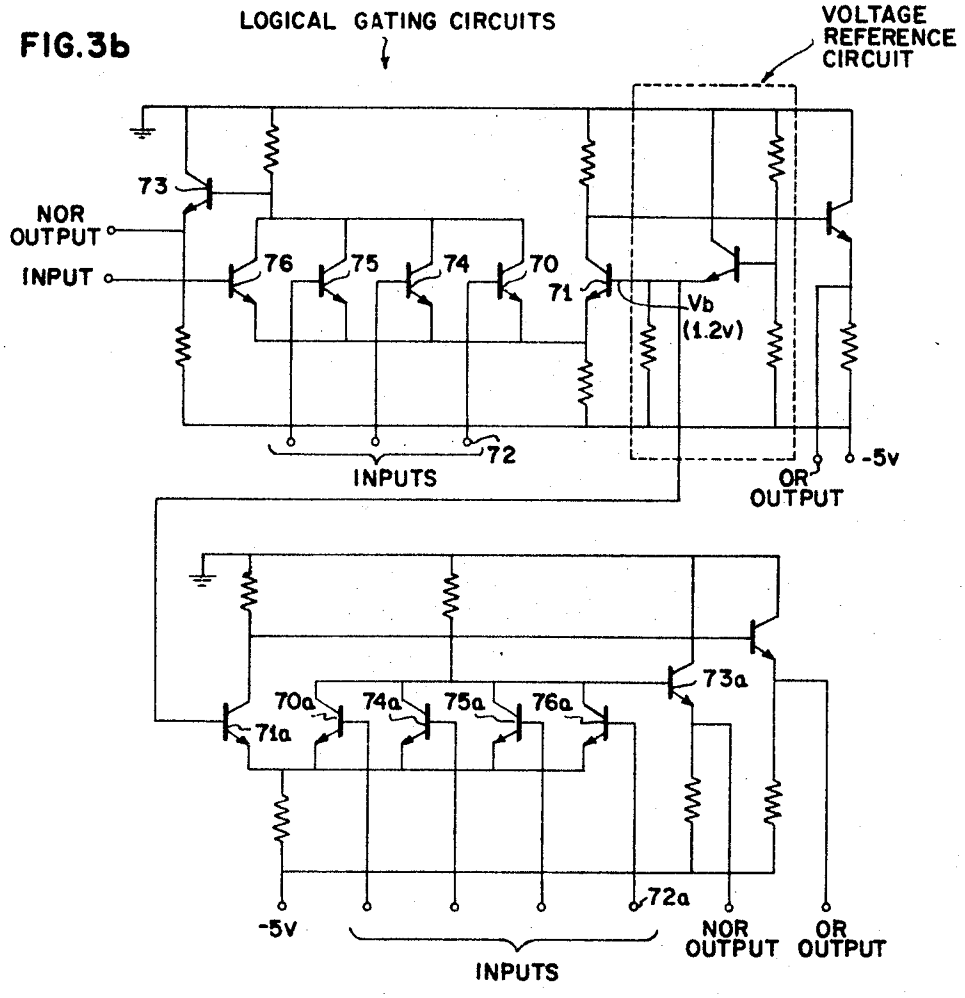
Figure 3C:
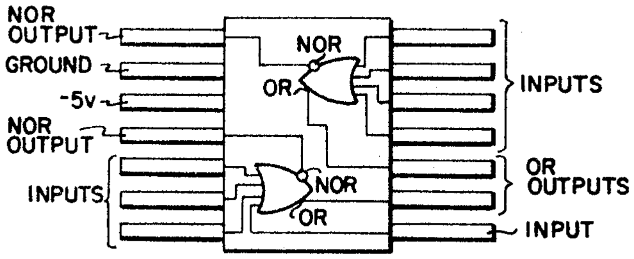
Figure 4:
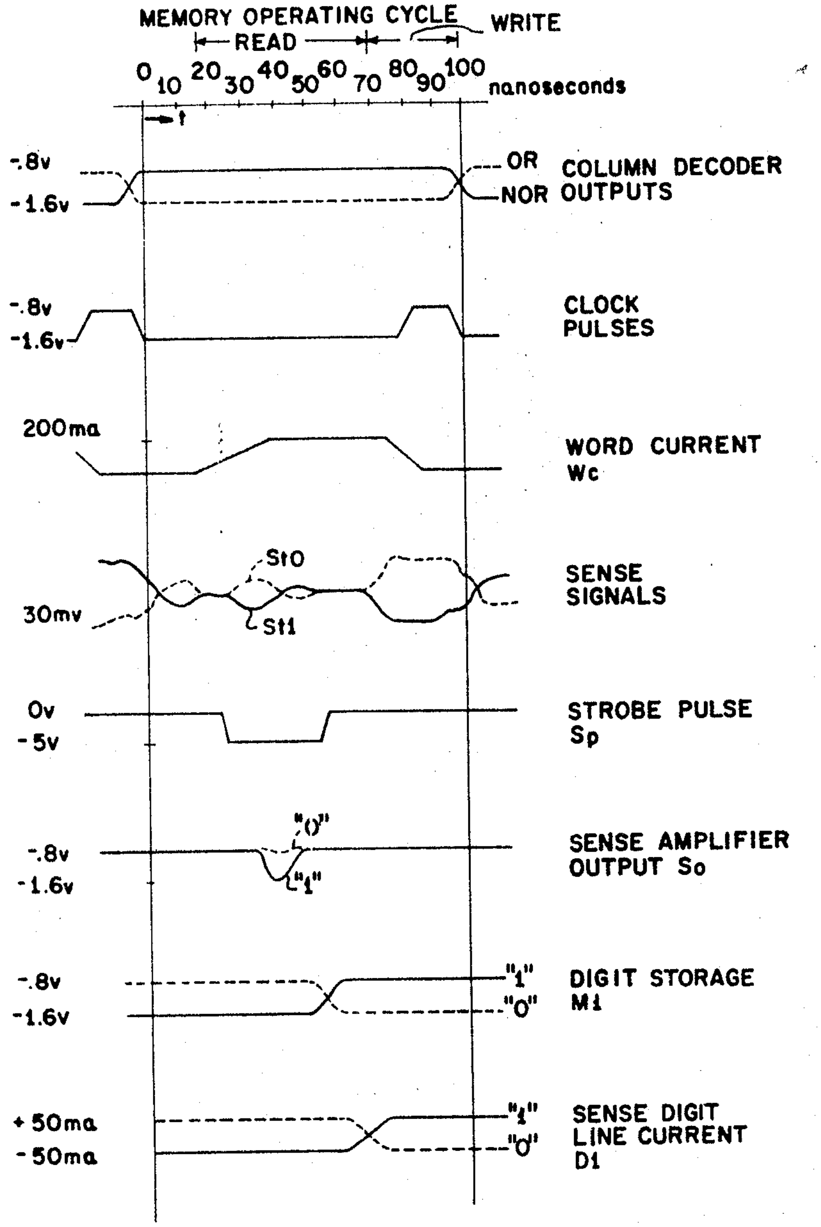
Figure 3D:
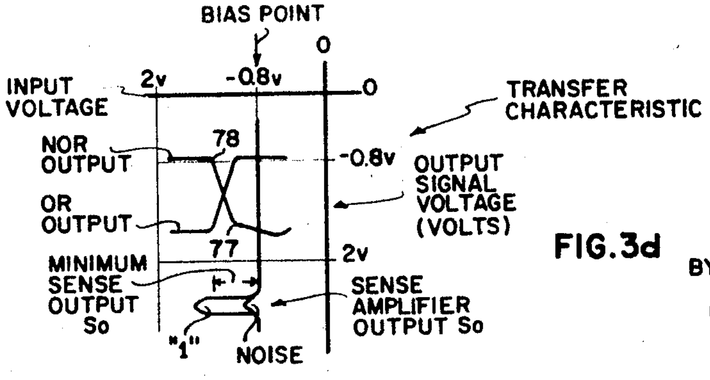
Figure 5A:
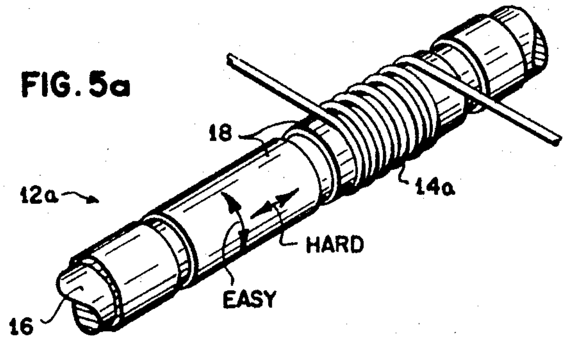
Figures 5B, 5C:
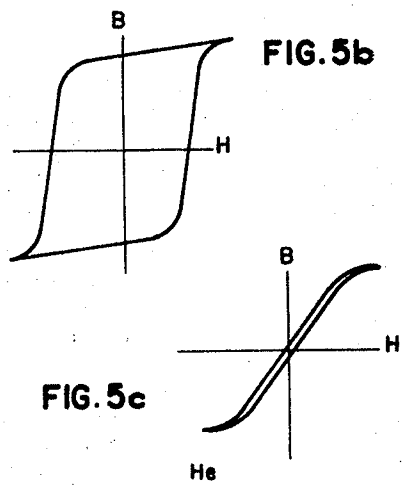

FIG. 3*a* is a detailed circuit diagram of the sense amplifier shown in block diagram in FIG. 3;

FIG. 3*b* is a detailed circuit diagram of a pair of emitter-coupled logical gating circuits of the present memory which are formed on a single monolithic integrated circuit "chip";

FIG. 3*c* is a plan view of one integrated circuit package for the "chip" including the pair of integrated circuits shown in FIG. 3*b*, and a logical block diagram therefor;

FIG. 3*d* is a diagram showing a typical transfer characteristic curve for either one of the logical gating circuits shown in FIG. 3*b*;

FIG. 4 is a timing diagram including typical signal waveforms for illustrating the operation of the memory arrangement of FIG. 1;

FIG. 5*a* is a perspective view of a portion of a typical magnetic thin film rod which rod has been greatly enlarged and shown in section to disclose its structure according to the preferred embodiment of the present invention;

FIG. *5b* is a characteristic curve illustrating the open hysteresis loop of the typical magnetic rod of FIG. *5a* along the circumferential easy axis of remanent magnetization;

FIG. *5c* is similar to FIG. *5b* and shows the closed hysteresis loop of a typical magnetic rod of FIG. *5a* along the longitudinal hard axis of magnetization;

FIG. *6a* shows the portion of the typical magnetic rod shown in FIG. *5a* with the addition of a solenoid winding to illustrate a typical digit storage position in the memory arrangement of the preferred embodiment of the present invention;

FIG. *6b* is a diagram showing a critical curve for illustrating the switching characteristics of the magnetic rod structure shown in FIG. *6a*;

FIG. *6c* is an abstract diagram showing the critical curve similar to that shown in FIG. *6b* and a modified Lissajous curve of the combined magnetic fields which are applied to the magnetic rod structure shown in FIG. *6a* for writing a "1" binary digit (bit) in the digit storage position;

FIG. *6d* is another diagram showing the curves similar to those illustrated in FIG. *6c* for writing a "0" binary digit in the digit storage position;

FIG. *7a* is a diagram of magnetization at the typical digit position illustrating applied magnetic fields and resulting changes in magnetization of the portion of the magnetic rod shown in FIG. *6a* during readout of a "1" binary digit from the digit position; and FIG. *7b* is a diagram similar to FIG. *7a* to illustrate readout of a "0" binary digit from the digit position.

Referring now to the drawings, FIG. 1 is a schematic diagram for illustrating the word selection circuit and the arrangement of magnetic storage elements of the magnetic thin film memory of the present invention. As shown in FIG. 1, the memory comprises a three-dimensional array of magnetic thin film rods 12 inductively coupled to word driver circuitry by solenoids or windings 14 at each digit storage position. Each group of solenoids 14 connected in series, forms a word line 15 which word line is coupled to a respective one of the word line transistors 17, i.e., one line transistor 17 for each word line 15. The word driver circuitry provides for linear selection of any single line transistor 17 for driving the respective word line 15 from a constant current source U1, for example, for word plane #1. In addition to the common current source U1, typical column driver circuit Y1 and row driver circuit X1 are shown in FIG. 1 for word plane #1 and corresponding driver circuits are provided for the remaining word planes #2 to #*n*. The details of these circuits for word plane #1, which are shown in block diagram in FIG. 1, are shown in FIG. 2 along with amplifier circuits for providing a change in signal level for utilizing the outputs of integrated circuits provided for decoding the word address for selecting word line **15*a* by column driver Y1 and row driver X1**, for example.

Sense-digit lines, sense amplifiers, digit storage circuits and digit drivers for the memory of the present invention, which are not shown in FIG. 1, are illustrated in FIG. 3 by a typical sense-digit line 30, sense amplifier SA1, digit storage circuit M1 and digit driver for the first digit position of each of the words of the memory. Corresponding circuits for the other digit positions (e.g., for a 36 digit word) have not been shown to simplify the explanation of the present invention.

Figure 2:
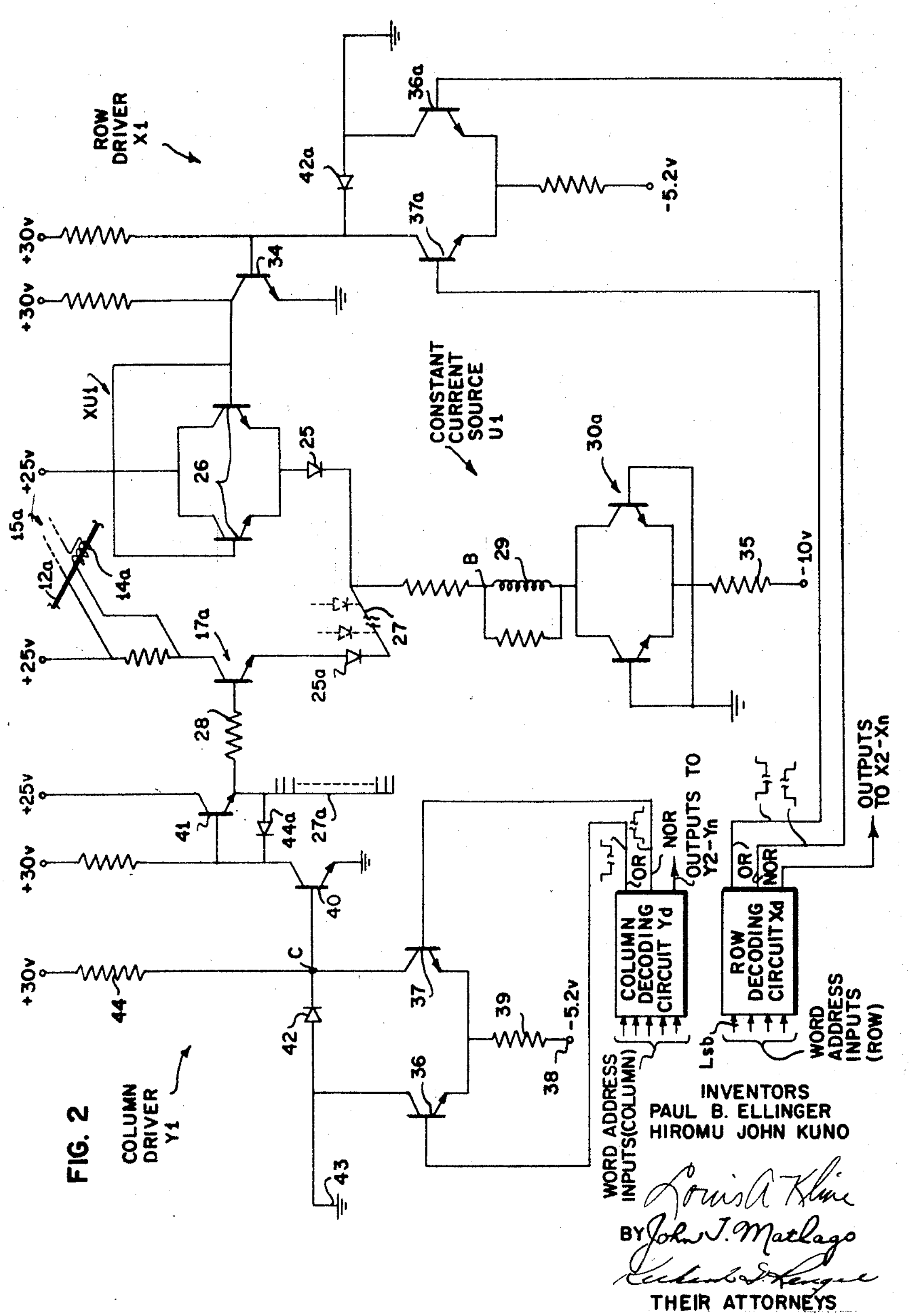
FIG. 2 is a schematic diagram showing the details of the word driver circuits for word plane #1 shown in FIG. 1.

A further detailed discussion of FIGS. 1 to 3 will follow the discussion of details and operation of a typical individual digit storage position in the memory of the present invention, including a discussion of structure and characteristics of the magnetic rods 12.

MAGNETIC ROD DIGIT POSITIONS
(FIGS. *5a* TO *7b*)

In FIG. *5a*, a typical section of the preferred magnetic thin film storage device, i.e., the magnetic rod **12*a*, is shown to comprise a cylindrical beryllium-copper substrate or rod conductor 16 of approximately .01 inch in diameter (10 mils) having spaced sections of permalloy plated magnetic thin film 18 of low coercivity comprising a nickel-iron (Ni-Fe) alloy preferably 80% to 82% nickel, 18% to 20% iron, which is electrodeposited on the rod conductor 16. Initially, a continuous uniform magnetic thin film 18 is formed on the conductor 16 having a thickness of approximately ten thousand angstroms (10,000 A.), e.g., a substantially constant thickness in the range of 8,000 A. to 12,000 A. While the magnetic thin film 18 is being deposited on the rod conductor 16, a magnetic field is produced in the area of electrodeposition, the known effect of which is to produce anisotropic properties in the magnetic thin film 18. In the preferred and well-known manner, therefore, a current is passed through the conductor to produce a magnetic thin film 18 having circumferential remanent magnetization, i.e., anisotropic properties and capability of rotatioanl switching remanent states, by a circular magnetic field produced about the rod conductor 16**. As shown in FIG. *5a*, an easy axis of remanent magnetizatoin is produced circumferentially in the cylindrical magnetic thin film 18. This provides the advantage of a closed flux path about the magnetic rod, when in the quiescent state, whereby a thin film having a thickness of 10,000 A. can be used having a minimum of demagnetization effects at this thickness resulting in increased switch output signals during read-out. In FIGS. *5b* and *5c*, typical hysteresis loops are shown for the anisotropic cylindrical thin film 18 in which an applied circumferential alternating magnettic field (low frequency) produces the rectangular hysteresis curve shown in FIG. *5b* and an applied alternating magnetic field in the longitudinal direction produces a substantially closed hysteresis curve shown in FIG. *5c*.

The magnetic thin film 18, as shown in FIG. *5a*, is formed in spaced sections on the conductor substrate to eliminate possible bit-to-bit interaction on a magnetic rod 12. This interaction is often referred to as "creep" and is caused by repeated application of a disturbing digit field in the presence of a slight (stray) transverse field, such as fringing from an adjacent digit storage position. As distinguished from the data storage operation produced by domain rotation, which is a first order effect, the "creep" is caused by domain wall motion and is cumulative where repeated storage operations for either "1" or "0" occur in adjacent digit storage positions. "Creeping" can also be eliminated by controlling the domain wall motion threshold. The provision of spaced, isolated sections of magnetic thin film on the conductor substrate 16 for individual digit storage positions thereon provides physically isolated magnetic regions which are not subject to bit-by-bit interaction without the requirement of controlling the domain wall motion threshold.

The process of forming the magnetic rod with isolated or spaced storage positions, as shown in FIG. *5a*, comprises an etching process in which the magnetic rod is selectively covered with a layer of chemical resist material, for example, following a continuous plating of the magnetic thin film. The exposed areas of the magnetic rod (not covered by a layer of chemical resist material) are etched off by a bath or solution capable of removing the magnetic thin film, but not the chemical resist material or magnetic thin film covered thereby, thus yielding isolated areas comprising the magnetic thin film sections shown in FIG. *5a*.

Figure 6A:
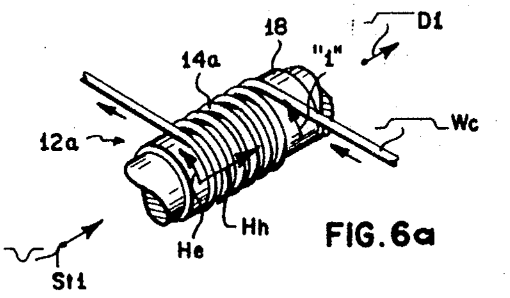

Referring now to FIG. *6a*, a section **12*a* of the magnetic rod 12**, shown in FIG. *5a*, is shown along with the solenoid winding **14*a* which combination comprises a typical digit position of the preferred memory arrangement of FIG. 1. A write operation is capable of changing the binary state at this digit position to store a binary digit "1" or "0" therein by concurrent word and digit current signals applied to the rod conductor 16 by solenoid winding 14***a*. A magnetic field along the easy axis (H*e*) is applied to the rod 12*a* in response to a write digit current D1 that is applied to the rod conductor 16 as indicated in FIG. 6*a*. A transverse magnetic field is produced along the hard axis. (H*h*) by word current W*c* which is supplied to the solenoid winding 14*a*. Concurrent word and digit current signals result in remanent magnetization along the easy axis in the direction as shown, to store the binary digit "1," for example. The multi-turn solenoid winding 14*a*, shown as having six turns in FIGS. 5*a* and 6*a*, is preferably a solenoid winding having ten turns and wound at a rate of approximately seventy-eight (78) turns per centimeter to provide a high concentrated magnetic field intensity in the thin film at the digit position for a given current level (e.g., 200 milliamperes). Each of the spaced sections of magnetic thin film are 0.105 inch in length and are spaced from one another by 0.02 inch. Either a binary digit "0" or binary digit "1" is stored by respective remanent magnetization states along the easy axis in the magnetic thin film 18. The resulting remanent magnetization state is determined during any writing period, when the word current W*c* is applied to the solenoid winding 14*a* and the write digit current D1 is applied to the rod conductor 16. The manner in which combined easy direction and transverse direction magnetic fields, produced by concurrent write digit current D1 and word current W*c*, switches the state of remanent magnetization of the magnetic rod 12*a* (along the easy axis H*e*) to store the binary digits "1" and "0" can be understood from the description of critical abstract diagrams including switching curves (astroids) shown in FIGS. 6*b*, 6*c* and 6*d*.

Figure 6B:
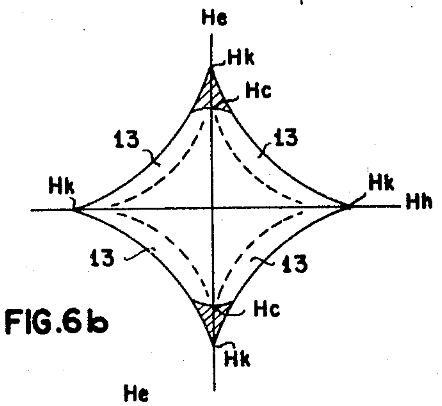

In FIG. 6*b*, the critical curve is shown to form an astroid (solid line). This is an idealized critical curve for domain rotation as is well known, and generally it can be stated that applied magnetic fields which cross the critical curve are capable of producing domain rotation. Also, magnetic fields having a resulting magnitude greater than H*c* which thereby project into the shaded areas are capable of producing switching of the remanent magnetization by domain wall motion. Furthermore, any magnetic field or combination thereof having a magnetizing force crossing the dashed line into a "creeping" zone 13, which is the area between the critical curve and the dashed line, is capable of altering the remanent magnetization state but generally without producing complete switching. While the magnetic rod 12*a* does not necessarily follow the idealized critical curve of FIG. 6*b*, this will serve as a basis for explanation of the reading and writing operations including the switching of the magnetization state of the magnetic rod 12*a* at the digit position shown in FIG. 6*a* since the critical curve of the magnetic rod 12*a* follows this idealized curve, as shown, with deviations resulting from different modes of operation and composition and structure of the actual thin films on the magnetic rod 12*a*. For example, the coercivity (H*c*) of the magnetic thin film 18 of the magnetic rod 12*a* is approximately 4 oersteds and the anisotropy (H*k*) is approximately 5 oersteds. In practice, the switching of magnetization states has been found to occur as a result of domain rotation wherein the point H*k* along the hard axis (H*h*) is approximately 7 oersteds. The memory arrangement is not limited to this particular mode of operation, as well be apparent from the description which follows, and the critical curves shown in FIGS. 6*b*, 6*c* and 6*d* serve to demonstrate the operation wherein switching of magnetization states primarily occurs as a result of domain rotation and the critical curves will be modified to the characteristics of the particular magnetic thin film and the particular signals used to switch the magnetization states of the magnetic thin film. Also, the composition of the magnetic thin film 18 and the manner in which it is deposited is controlled to provide for switching by domain rotation.

Figure 6C:
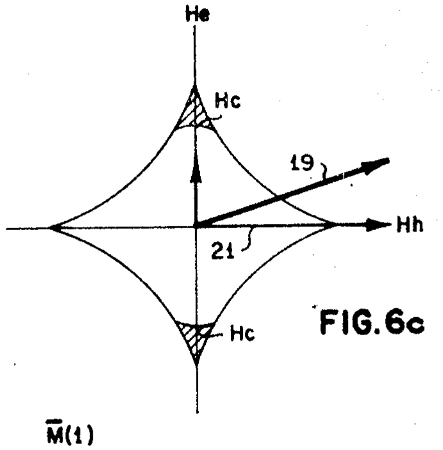
Figure 6D:
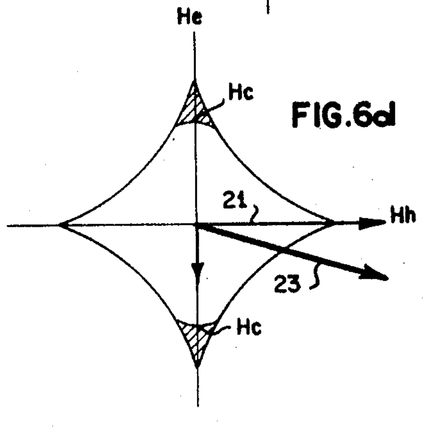

Referring now to FIG. 6*c*, a heavy line 19 shows the resultant combined magnetic fields produced in the magnetic thin film 18. These combined magnetic fields result from a word current W*c* and a write digit current D1 for writing the binary bit "1" in the digit position shown in FIG. 6*a*, for example. In FIG. 6*d*, a typical magnetic field for storing binary digit "0" is shown by line 23 wherein the write digit current D1 (FIG. 6*a*) is in the opposite direction than for a "1" bit. It should be appreciated that after applied magnetic fields produce a resultant magnetic field crossing the critical curve as shown in FIGS. 6*c* and 6*d*, the magnetization vector $\overline{M}$ (FIGS. 7*a* and 7*b*) will return to the easy axis (H*e*) of remanent magnetization. Accordingly, the combined applied magnetic fields illustrated in FIG. 6*c* result in magnetization $\overline{M}$(1) shown in FIG. 7*a* and the combined applied magnetic fields illustrated in FIG. 6*d* result in magnetization $\overline{M}$(0) shown in FIG. 7*b*. Thus, the binary states "1" or "0" are stored by the simultaneous application of orthogonal magnetic fields to the cylindrical thin film 18 of the magnetic rod 12*a* wherein a circumferential magnetic field is applied along the easy axis (H*e*) by the digit current for binary digits "1" and "0" and a transverse magnetic field 21 is applied along the hard axis (H*h*) and at the digit position; and the combination of fields produces the combined magnetic fields. Depending upon the polarity, the direction of the combined magnetic fields is either along the line 19 or along the line 23 (FIGS. 6*c* and 6*d*). Since the magnitude of the combined fields exceeds the switching threshold of the magnetic thin film 18, i.e., crosses the critical curve, the direction of remanent magnetization along the easy axis (H*e*) is determined by which side of the hard axis (H*h*) the resultant field lies, as illustrated by lines 19 and 23 (FIGS. 6*c* and 6*d*).

Figure 7A:
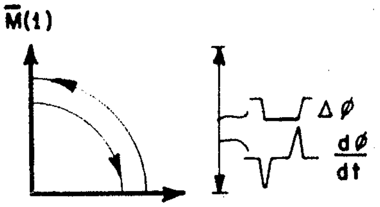
Figure 7B:
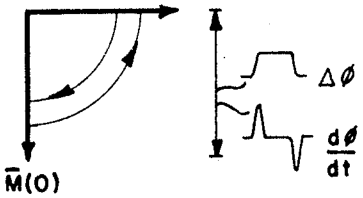

In the previous discussion, the explanation was concluded by describing the storing of binary digits "1" and "0" by writing at a digit position of the memory which writing is capable of changing the direction of magnetization along the easy axis (H*e*) by switching the state of magnetization to $\overline{M}$(1) or $\overline{M}$(0). In the present embodiment of the memory arrangement, only a single memory operating cycle provides for both reading and writing or writing-back operations. Prior to the writing operation, the word current W*c* is produced which provides for reading-out the addressed word. The word current W*c* produces an applied (pulsed) transverse magnetic field along axis (H*h*) of such magnitude that the switching threshold of the magnetic thin film 18 is exceeded by a substantial amount to produce a very large and rapid change in flux and thereby produce a relativeely high amplitude sense output signal. It should be clear that the present invention is not limited to this mode of operation, i.e., destructive readout (DRO), even though the present embodiment provides for a write operation after each read operation. The memory of the present invention is capable of operating in a completely nondestructive readout (NDRO) manner by limiting the amplitude of the word current W*c* to produce a transverse magnetic field not exceeding the switching threshold of the magnetic thin film and this magnetic field produced thereby does not enter into the "creeping" zone 13 of the magnetic thin film 18 to disturb the magnetization state $\overline{M}$(1) or $\overline{M}$(0) and restoring is completely unnecessary to maintain the binary magnetization state $\overline{M}$(1) or $\overline{M}$(0) (FIGS. 7*a* and 7*b*). Operation in the NDRO manner assumes that the digit current D1 not be present during any NDRO memory cycle, and therefore, return to zero digit current would be required in the operation of the NDRO application of the present memory. In order to provide improved operation at higher speeds, however, the present embodiment, as shown, provides for operating in a destructive readout manner wherein the word current *Wc* produces an applied transverse magnetic field which far exceeds the switching threshold of the magnetic thin film 18 of the rod 12*a* and each memory operating cycle includes both a read operation and a write operation wherein the write-back operation provides for restoring the desired magnitude of magnetization $\overline{M}(0)$ or $\overline{M}(1)$ after each read operation in order to tolerate or provide for switching of the remanent magnetization M as a result of an applied transverse magnetic field, and also the circumferential magnetic field incidental to the continued flow of digit current D1 which is present during the entire memory operating cycle including the read and write time periods.

Summarizing the foregoing, each memory operating cycle comprises a read time period followed by a write time period as shown by the timing diagram of FIG. 4. During the read time period, the state of the thin magnetic film 18 at digit positions of a selected word are sensed, e.g., the state of the film 18 at the digit position in the area of solenoid winding 14*a* is sensed, by applying word current W*c* to the solenoid winding 14*a* to produce a unidirectional transverse magnetic field along the hard axis (H*h*) which axis (H*h*) is transverse to the easy axis of magnetization. The write time period, which follows the read time period, includes supplying the proper polarity digit current D1 in addition to the word current W*c* to produce the combined magnetic fields for writing either binary digit "1" or "0" at the digit positions of the selected word.

DETAILED DESCRIPTION (FIGS. 1 TO 3)

Referring again to FIGS. 1 to 3 for a detailed discussion of the memory circuit arrangements of the present invention, the magnetic thin film rods 12 and solenoids 14 are disposed in a three-dimensional array and supported in individual word planes #1 to #*n*, as shown in FIG. 1. The array is assembled so that the solenoids 14 are axially aligned and the magnetic rods 12 are then inserted and connected in a transposed, noise-cancelling pattern which is shown in FIG. 3 for a typical sense-digit line 30, including sixteen magnetic rods 12*a*, 12 for example, wherein the memory would include sixteen word planes (i.e., #*n*=16). Also as shown in FIG. 3, the sense amplifier SA1 is connected to bridge the sense-digit line 30 in the middle thereof and the digit driver DR1 is coupled to opposite ends of the sense-digit line 30 to provide for symmetrical driving of this line from the opposite ends thereof. Connections between magnetic rods 12*a*, 12 are provided by light, flexible conductors to avoid any stress being transmitted to the magnetic rods 12*a*, 12. The sense-digit line 30 is terminated with at least a single resistor at each end (resistors 31 and 33). The solenoids 14*a*, 14 about the magnetic rods 12*a*, 12 form inductances and the capacitance between the solenoids and magnetic rods presents a separate lumped-constant transmission line for each of the "odd" and "even" sides of the line 30. The sense amplifier SA1 detects the difference in voltage between two halves of the sense-digit line 30.

Having considered the sense-digit circuitry briefly as shown in FIG. 3, the details of the word selection circuitry, as shown in FIGS. 1 and 2, will be described. The word selection circuit provides linear selection of any word line transistor 17, e.g., word line transistor 17*a*, by activating a corresponding set of one of the column drivers Y1–Y*n* and one of the row drivers X1–X*n*. This causes word current W*c* to flow in selected word line 15*a*. The particular column and row driver circuits activated for selection of a word line transistor 17 are provided by column and row decoding circuits Y*d* and X*d*, respectively, shown by block diagram in FIG. 2. Column decoder circuit Y*d* is shown in FIG. 2 to have inputs for binary signals for selection of any one of thirty-two column drivers Y1–Y*n* (wherein *n*=32), and the row decoder circuit to have inputs for selection of any one of sixteen row drivers X1–X*n* (wherein *n*=16), for example, to provide a linear matrix of 32 columns and 16 rows for individual selection of any one of the transistors 17 and 512 word lines 15. As shown in FIG. 1, activation of column driver Y1 and row driver X1, for example, selects word line transistor 17*a*. As a result of this selection, word current W*c* is supplied only to word line 15*a* and solenoids 14*a* in this word line 15*a* in the respective exemplary memory cycle.

The word selection circuits are shown in FIG. 1 to be directly coupled to respective word lines 15 by line transistors 17, one line transistor 17 for each word line 15. The line transistors 17 eliminate sneak paths while reducing the parasitic capacitance coupled to the column and row drivers, which is very important to operation at higher speeds of 10 megacycles, for example. The collector of each of the line transistors 17 is connected to one end of the respective word line 15 and the other end of the respective word line is connected to a source of direct current voltage (+25 v.) whereby the word lines 15 are isolated from the circuits connected to emitters of line transistors 17. The near end of each of the word lines 15 is terminated by a resistor 24 as shown in FIG. 1. The far ends of word lines 15 (adjacent the last solenoid in each word line) are shorted. Since the word lines are driven by current sources U1–U*n*, a first voltage reflection produced upon selection of any word line 15*a*, for example, is inverted at the far (shorted) end and returned to the sending end (collector of line transistor 17*a*) wherein the termination resistor 24*a* prevents a second voltage reflection. Thus, assuming the rise time of the word current W*c* is larger than two times the delay of word line (e.g., 12 nanoseconds), a uniform rise of word current W*c* will be provided. Further, the problem of driving any of the word lines 15 from a constant current source while the word line voltage is changing is avoided by the fact that when the word current W*c* is first applied to the selected one of the word lines 15, the shorted (far) end does not affect the word current W*c* and the selected word line 15 exhibits its characteristic impedance. Accordingly, a voltage will build up at a substantially constant rate across the selected word line 15 (e.g., 25 v.) and then return at a substantially constant rate to zero as the short across the end of the word line 15 becomes effective after the period of delay of the word line.

As shown in FIG. 1, the line transistors 17 include emitters which are coupled to the constant current source U1 and row driver X1, for example. The row driver X1 controls dummy load XU1 including transistors 26 whereby the constant current through the constant current source U1 is switched from the dummy load XU1 (alternate current path) to row bus 27 and a selected one of the word lines 15*a*, for example. In the selection of row driver X1 in the exemplary word line selection and memory cycle being considered, the constant current source U1 supplies whatever voltage is necessary during switching to a selected word line to maintain a constant current (e.g., 200 ma.). Thus, upon selection of row driver X1, both dummy load transistors 26 are "turned-off" to switch the constant current to row bus 27 and particularly to the selected word line 15*a*. Because the word lines 15, and specifically, the selected word line 15*a*, are primarily inductive, a negative voltage is developed on row bus 27 at the instant of switching which voltage is the supply voltage (+25 v.) plus the line transistor voltage drop, assuming that the line transistor 17*a*, for example, on row bus 27, is selected and "turned-on" by column driver Y1.

Referring briefly to the column selection, the column driver Y1 selected for the exemplary memory cycle causes line transistor 17*a* to be driven into saturation by applying a relatively slowly rising voltage to the bases of all line transistors 17 coupled to column bus 27*a*. The signal applied to the base of line transistor 17*a* is shaped by the driver circuit Y1 (shown in detail in FIG. 2) to supply just enough current to keep the line transistor 17*a* in a state of saturation. This is important to the operation because the base current in line transistor 17*a* flows through the emitter thereof and into the current source U1 thereby subtracting from the effective word line current to word line 15*a*. Current limiting resistors 28 are provided for coupling the column driver Y1 to insure even distribution of current from column driver Y1 to line transistors 17 in the respective column. Unselected transistors 17, which are coupled to the column driver Y1, will be subjected to a reverse bias of 25 volts across their base-emitter junctions because the row buses connected to the emitters will remain +25 volts, for example, while voltage applied to the bases will be at ground potential. Since this exceeds the reverse voltage rating of most high speed transistors, diodes 25*a*, are added in series with the emitter of each line transistor 17 and also dummy transistors 26. In practicing the present invention, it is preferable to provide monolithic integrated circuits having silicon substrates for the transistor, resistors and diode elements of the entire row of word line circuits.

Referring now to FIG. 2 for a discussion of the details of a typical one of constant current sources U1–U*n*, and column and row driver circuits Y1 and X1, which are shown in detail in this figure, the constant current source U1, as shown, is capable of supplying a constant word current W*c* in successive memory cycles of 100 nanoseconds and is an important feature of the memory of the present invention. Because of the time required for recovery of a conventional inductive current source (more than the 100 nanoseconds cycle time of the present memory), the inductive current source was not capable of recovery in time to maintain the high voltages necessary to supply word current W*c* to the word lines 15 in successive memory cycles. On the other hand, transsistors, now available, are not capable of accommodating the voltage variations necessary to maintain a constant word current W*c* equal to 200 ma. Further, as improved transistors are made available, the demand for higher voltages also increases to provide a continuing need for the improvements of the constant current source of the present invention. As shown in FIG. 2, this constant current source provides word currents W*c* at (FIG. 4*c*) at the high speeds required by the present memory by a combination of an inductive current source including inductor 29 and a constant current transistor circuit 30*a*.

In operation of the word selection circuit, the constant current source accepts the current from the dummy load until its transistors 26 are "turned-off" by row driver transistor 34 as a result of selection of row driver circuit X1 by row decoding circuit X*d*. Row bus 27 is normally at substantially the supply voltage potential (+25 v.), but when the dummy load XU1 is turned-off, row bus 27 is lowered suddenly to ground potential as the current path is switched from the dummy load XU1 to the selected word line 15*a*. The line transistor 17*a* for the selected word line 15*a* is driven into saturation at this time of switching by the column driver Y1 whereby the supply voltage (+25 v.) therefore is applied across the word line 15*a* to drive the constant current through this inductive load. Accordingly, the constant current source U1 continues to provide this constant current via diode 25*a* to the selected word line 15*a* to produce a word current W*c* of 200 ma., for example, which is the same current amplitude that previously had been flowing through the dummy load XU1.

In order to supply the required current to the word line 15*a*, the constant current transistor circuit 30*a* operating in conjunction with the inductor 29, is capable of operating under all conditions of required voltage variations, and particularly, to provide for applying the relatively high voltage (+25 v.) across the word line immediately after switching from the dummy load XU1 to the selected word line 15*a*. As noted earlier, the inductor 29 alone could not continue to supply the required current because the recovery time of the inductor large enough to develop the required voltages to maintain this constant current is too long. Accordingly, the inductor 29 is made sufficiently large (120 microhenries) to maintain only a portion of this constant current at the instant of switching to the word line 15*a* and the remaining current can be readily provided by the high-speed transistor circuit 30*a* without exceeding the breakdown voltage of the transistor junctions. The transistor circuit includes a pair of npn transistors (e.g., type 2N2219) connected in parallel with both bases connected to ground potential and emitters connected to a current source including a resistor 35 (e.g., 50 ohms) and voltage supply source terminal (−10 v.)

Referring now to the drivers Y1 and X1, the circuit arrangement of the column driver only will be described in detail since the row driver circuit is identical to the extent of stages shown in FIG. 2. The column and row driver circuits are very important to the operation of the present invention in providing the power requirements necessary for supplying relatively high currents to the line transistors 17 and dummy loads, as described earlier in connection with FIG. 1. It should be noted that this word selection circuit arrangement provides row-column decoding by connecting the bases of the line transistors 17 together in columns (e.g., to the column bus 27*a*, FIG. 1)and the emitters in row (e.g., row bus 27). The isolation provided by this arrangement provides for larger memories which can be segmented to be driven from multiple drivers for each row and column. In prior circuit arrangements using diodes, for example, this isolation is not provided for, which limits the size of the memory that can be operated at high speeds and a specified factoring.

In view of the relatively high power requirements and inductive load conditions, relatively high supply voltages are necessary to provide fast response and the high speed operation of the word driver circuits. At the same time, it is desired to control the word driver circuits from recording circuits Y*d* and X*d* operating at low voltages and currents in a high density environment of monolithic integrated circuits. While it is highly desirable to operate the decoding circuits, storage registers and other circuits at low power to provide low power consumption suitable for high density environments for economy in circuit design; provision must be made for changing the level of operation from these decoding circuits to meet the necessary power requirements for memory drivers which must provide power at relatively high voltages. For example, column and row decoding circuits Y*d* and X*d* comprise monolithic integrated logic circuits having silicon substrates operating at low power to allow for heat dissipation in a high density environment. These logic circuits are of emitter-coupled type (ECL), for example, providing OR and NOR outputs (positive logic) varying between −0.8 volt and −1.6 volts, for example, representing "0" and "1," respectively. At the high speeds required, an individual logic circuit provides a relatively low output current (e.g., 3 ma.) for control of memory driver circuits, such as driver R1. The word driver (row and column) circuits of the present invention, as shown in FIG. 2, provide for changing from this low voltage current level of decoding circuits to operation at over a voltage range of 25 volts and 200 ma., for example. In order to provide for driving the word circuits of the present memory at the high speeds required for memory operating cycles of 100 nanoseconds, the column driver circuit Y1, for example, provides for utilizing both OR and NOR outputs of a respective one of the logic gating circuits of the column decoding circuit Y*d*. In operation, the column driver Y1 is responsive to a change in level of each of the OR and NOR outputs to low and high levels (e.g., −1.6 v. and −0.8 v., respectively) to supply "turn-on" current to column bus 27*a* to drive the selected line transistor 17*a* on row bus 27 into a state of saturation to provide word current W*c* to the selected word line 15*a*, for example. The circuit operation of column driver Y1 during exemplary selection of column bus 27*a* is as follows: Transistor 36 (FIG. 2) is responsive to the change in level from high to low logical voltage levels (−0.8 v. to −1.6 v.) coupled to its base to "turn-off," and transistor 37 (FIG. 2) is responsive to the change from low to high logical voltage levels to "turn-on." As is evident, the opposite changes in logical level at the base of each transistor 36 and 37 provide for high speed switching operation and should be distinguished from circuits of the differential type in which the input signals are applied only to one side (transistor) and a reference voltage is coupled to the other side (transistor). The present driver circuit provides for twice the swing in applied voltages to transistors 36 and 37 for faster operation of the driver circuit and memory and takes advantage of the separate changes in level provided by the OR and NOR outputs of the respective logical gate of the column decoder circuit Y*d*.

Normally, prior to selection of column driver Y1, transistor 36 is "turned-on" and transistor 37 is "turned-off." The current in transistor 36 is from ground at the collector through base and emitter to the common voltage supply 38 which in combination with resistor 39 provides a current source. The current flow through either one or the other of the transistors 36 or 37 depends upon the inputs to the respective bases thereof as described supra. Prior to selection, therefore, the other transistor 37 is "turned-off" and the collector is at a higher voltage level of the two levels (e.g., −0.8 v. and +0.8 v.) which causes transistor 40 (amplifier stage) to be "turned-on." The latter transistor 40 in this "on" state maintains a lower voltage at the base of driver transistor 41 ("turned-off") until selection of word line 15*a* is made by changes in the levels of the outputs of column decoding circuits to the transistors 36 and 37, indicated by waveforms at the respective outputs in FIG. 2 (and FIG. 4*a*.)

One exemplary change in voltage level of the decoder output signals upon selection of column driver Y1 is: driver transistor 41 is "turned-on" to rapidly drive line transistor 17*a* into saturation in order to produce the word current W*c* in word line 15*a*. In order to provide the word current W*c* as early as possible in the memory cycle, line transistor 17*a* must be driven into saturation within approximately 10 nanoseconds from the time the logical gate of the decoder circuit Y*d* supplies the logical level changes at the output as shown in FIG. 2. Accordingly, the collector circuit of transistor 37 includes a diode 42 which provides for supplying current from ground 43 to the collector of transistor 37 when transistor 37 is "turned-on" and the voltage level at node C is rapidly changing from +0.8 volt to −0.8 volt, for example. Accordingly, the resistor 44 can be relatively large (e.g., 2400 ohms) for supplying base current only to transistor 40. Alternatively, when transistor 40 is "turned-off" and transistor 37 is "turned-on," resistor 44 is capable of continuing to supply this amount of current to transistor 37, and in combination with the current released due to "storage" in the base of transistor 40, sufficient current is provided for transistor 37. As soon as the voltage at node C lowers below ground potential, diode 42 is forward biased and adequate current for transistor 37 is supplied therefrom to the current source of the common emitter circuit of transistors 36 and 37, and the voltage at node C will lower to −0.8 volt, for example, to rapidly "turn-off" transistor 40. It should be noted that diode 42 also operates to prevent saturation of transistor 37 whenever transistor 37 is "turned-on."

Considering the description of the column driver operation in the exemplary memory cycle, when transistor 40 is "turned-off" as described, driver transistor 41 is "turned-on" by the rising voltage level applied to its base. Transistor 41 then provides current to drive the line transistor 17*a* into saturation. It should also be noted that diode 44*a* provides a path for connecting the column bus 27*a* to ground at the emitter of transistor 40 to maintain this column bus 27*a* at ground potential during time periods between selection of this column bus.

Referring briefly to the row driver circuit X1, shown in FIG. 2, the row amplifier circuit including transistors 36*a*, 37*a* and diode 42*a*, corresponds to column amplifier circuit including transistors 36, 37 and diode 42. Further, the row amplifier circuit including transistor 34 corresponds to column amplifier circuit 40. In operation, however, it is desired to "turn-off" the dummy transistors 26. Accordingly, transistor 36*a* is coupled to the NOR output and transistor 37*a* is coupled to the OR output of row decoding circuit X*d*, and a high logical voltage level signal (−0.8 v.) is applied to transistor 36*a* and a low level signal is applied to transistor 37*a* during memory cycles in which row bus 27 is selected for word plane #1 (FIG. 1) including word line 15*a*. Normally, prior to selection of row driver X1, transistor 37*a* is "on," transistor 34 is "off," and the dummy load transistors 26 are "on" to provide the alternate current path therethrough from the constant current source. In response to the row decoder X*d* output signals, as shown, transistor 37*a* is "turned-off," transistor 34 is "turned-on," and dummy transistors 26 are "turned-off," causing the constant current from source U1 to be switched to row bus 27 and the word line 15*a* selected by column driver Y1.

Referring now to FIG. 4, the typical waveforms illustrate the preferred operation of the memory of the present invention as described in connection with FIGS. 1 to 3. Typical column decoder outputs to column driver Y1 for selection of column driver Y1 by the column decoder circuit and corresponding outputs are provided by the row decoding circuit for row driver X1. The column and row decoder circuit outputs in the exemplary memory cycle are illustrated changing at the beginning and end of the cycle in order to show a change in address for the memory cycle and it should be realized that the same memory word location may be accessed in successive memory cycles if desired whereby the outputs would not change as illustrated. The clock pulses C for timing the memory cycle are illustrated in FIG. 4*b*. Pulse generators such as delay lines and pulse shapers (not shown) are responsive to the clock pulses to produce strobe pulse S*p* (FIG. 4*e*), for example. The remaining waveforms (except FIG. 4*e*) are provided to illustrate the sense-digit line circuits of FIGS. 3 and 3*a* which will now be described in further detail.

Referring to FIGS. 3 and 3*a*, the circuits for sense amplifier SA1 and digit driver DR1 are shown for the single sense-digit line 30 including magnetic rod 12*a* and the corresponding magnetic rods 12 disposed in vertical alignment therewith (as shown in FIGS. 1 and 3), which provides for all the first digit storage positions of all the words of the memory. As shown in FIG. 3, the sense-digit line 30 is connected in a balanced-transposed arrangement in which the sense amplifier SA1 is connected across the sense-digit line 30 as shown in FIG. 3 and described supra. The magnetic rods 12*a*, 12 have been designated as "even" and "odd" in FIG. 3 according to which side of the sense amplifier SA1 that the magnetic rod is connected. This is important, as noted infra, to ascertain the sense signal outputs as either "1" or "0"; and the least significant bit signal L*sb* of the address is coupled to the threshold circuits of the sense amplifier SA1 to designate the magnetic rod 12*a* as an "even" magnetic rod, for example, and the sense signal $St1$ shown in FIGS. 3a and 4 is a signal indicating storage of a "1" bit (binary digit).

As shown in FIG. 3a, the sense amplifier SA1 is shown to include two stages of differential amplification (circuits 51 and 55) and strobing (circuit 58) followed by threshold detection (circuits 60e, 60d, 62e and 62d). Preferably, the circuits of both stages of amplification are formed in a single silicon substrate (monolithic integrated circuit "chip"). Of primary importance is that both halves of these circuits for each individual stage of differential amplification be formed on a single "chip" or at least on a common header in the same enclosure to provide direct current stability which results from the common thermal environment of a single substrate or header. The importance of providing a single "chip" for at least each stage is to provide substantially identical temperature coefficients of both halves of each differential amplifier circuit. The strobing circuit 58 provides for applying a strobe pulse $Sp$ to the emitters of the differential amplifier circuit 55 to prevent overloading during the time interval of the digit transient (timing and waveforms illustrated in FIGS. 4d and 4e). This is a substantial improvement over strobing of the threshold detection circuits following the amplification stages. Further, the provision of a single change in digit current level (or no change in digit current level) is provided by a non-return-to-zero (NRZ) to minimize or eliminate digit current transients during a memory cycle since only a single transition or no transition occurs during each memory cycle. The present invention thus provides for NRZ digit current throughout the operation of the memory to provide a minimum of digit current transients.

The threshold detection circuits comprise four emitter-coupled logic circuits (ECL) which are discussed infra. These circuits are particularly suitable for detection of sense signals and provide for additional advantage in utilizing monolithic integrated circuits in detection of the amplifier sense signals coupled thereto from the monolithic integrated amplifier stages.

Referring now to the circuit details shown in FIG. 3a, the sense amplifier SA1 includes an input transformer 50 and the signal waveform at the upper input side indicates a "1" bit is being read-out of the bit storage position of "even" magnetic rod 12a at word solenoid 14a (FIG. 3). A "1" bit read-out of an "odd" magnetic rod 12 would produce the same signal waveform at the lower input side to transformer 50. Differential detection of the signals on the sense-digit line 30 is provided by this transformer 50 and the differential amplifier stages 51 and 55 as shown wherein reference ground potential is connected between (1,000 ohms) resistors connected across this transformer's secondary winding, as shown. The first amplifier stage is coupled to the secondary winding of the transformer by inputs 52 and 53. A direct coupled "long-tail pair" circuit (differential amplifier 55) is shown coupled to the outputs of the amplifier stage. This circuit referred to as the "long-tail pair" is disclosed in an article entitled "A High-Speed Direct-Coupled Magnetic Memory Sense Amplifier Employing Tunnel Diode Discriminators" in the publication IEEE Transactions on Electronic Computers, vol. EC-12, No. 3, pp. 282–295, dated June 1963. The present circuit arrangement provides for much higher speed operations than disclosed in said article to provide improved common mode rejection required at these higher speeds. High common mode rejection is difficult to obtain at high speeds due to capacitive unbalance between the two halves of the "long-tail pair" circuit.

As shown in FIG. 3a, amplifier circuit 51 comprises a portion of the single monolithic integrated circuit "chip" (silicon substrate). This amplifier 51 includes a "feedback" circuit (lines 51a and 51b) coupling its outputs back to the inputs 52 and 53. Outputs 54 of the amplifier circuit 51 are coupled to the differential amplifier circuit 55 ("long-tail pair") in which the outputs (collectors) are coupled to an emitter-follower stage 56. The inputs to the emitter-follower stage are limited (e.g., to an upper level of +0.8 v.) by diodes coupling the bases to ground potential 57 to pass only amplified sense signal (e.g., $St1$) and eliminate noise including the strobe pulse $Sp$ applied to the input of strobing circuit 58 and thereby to the emitters of differential amplifier 55. In the absence of the limiting action, the strobe pulse $Sp$ would be coupled through the emitter-follower stage 56 to the threshold detector circuits. Level clipping is provided at the outputs of the emitter-follower circuits 56 whereby only negative-going sense signals are coupled via the emitters to threshold circuits 60e, 60d, 62e and 62d. Series diodes 59 are provided for adjustment of the signal level of the sense signals at inputs to these logical gating circuits to the signal levels thereof (−0.8 v. and −1.6 v.). It should be noted here that the exemplary low level sense signal $St1$ indicates a "1" bit at the sense input to threshold circuits 60e and 60d but only threshold circuit 60e gates the low level sense signal. However, it should be noted that a low level sense signal indicates a "0" bit at the input to threshold circuits 62e and 62d whenever an "odd" magnetic rod 12 is being accessed and only threshold circuit 62d gates the low level sense signal.

A combination of negative and positive logic is applicable in the consideration of the operation of these threshold circuits. Accordingly, the low level word row address signals $Lsb$ are applied to corresponding inputs of these threshold circuits to gate the sense signals. For example, the least significant bit signal $Lsb$ provides a low logical level (−1.6 v.) whenever one of the "even" magnetic rods 12a, 12 of sense-digit line 30 is being addressed for access to data. This low level signal is applied to threshold circuits 60e and 62e to gate the sense signal $St1$ through circuit 60e, for example, as shown. An address bit signal $Lsb'$ (−1.6 v.) is applied to logic circuits 60d and 62d whenever "odd" magnetic rods 12 in the sense-digit line 30 are being addressed to gate the corresponding sense signal through threshold circuit 60d, or 62d. A combination of a low level sense signal and low level gating address signal ($Lsb$ or $Lsb'$) at only one of the threshold circuits produces a high level (−0.8 v.) output at only one NOR output of the logic circuits 60e, 60d, 62e, and 62d. In the exemplary memory cycle being considered, a "1" bit is being read out of an "even" magnetic rod 12a. Thus, the signals indicated in FIG. 3a are produced to provide a high logical level signal at input $Ms1$ to set the digit storage circuit M1 to a "1" state. As a result, a low level output signal (−1.6 v.) is produced at output $M_1'$ (OR output) which is coupled to complementary transistors 66 and 68 (via voltage amplifying and inverting transistor 64) to "turn-on" driver transistor 68 in order to accept digit current D1 through the sense-digit line 30 in the direction indicated by the arrows in FIGS. 3 and 3a. At the same time, output $M_1$ (OR output) produces a high level output signal (−0.8 v.) which is coupled to complementary transistors 65 and 67 (via transistor 63) to "turn-off" transistor 65 and thereby "turn-on" transistor 67 to drive digit current D1 into sense-digit line 30.

In the foregoing exemplary discussion, the "1" bit sense signal $St1$ is passed by logical circuit 60e. In the event the bit "0" is read-out of the exemplary digit storage position, a corresponding low level signal is produced at the sense signal input to logical circuit 62e and passed to its respective reset input $Mr1$ of the digit storage circuit M1 to reset M1 to provide outputs for producing digit currents D1 in the opposite direction in sense-digit line 30. On the other hand, whenever digit storage positions in any one of the "odd" magnetic rods 12 in the sense-digit line 30 is being addressed (accessed), a "1" bit sense signal, for example, is coupled to logical circuit 62d and a "0" bit sense signal is coupled to logical circuit 60d to provide for detection of bits read-out from either "odd" magnetic rods 12 of the sense-digit line 30.

In the foregoing discussion of the operation of the sense amplifier circuits, it should be noted that monolithic integrated circuits in the form of emitter-coupled logical (ECL) gating circuits are employed as threshold detectors 60*e*, 60*d*, 62*e*, 62*d*. In other instances, these gating circuits are utilized in the conventional manner for decoding in column and row decoding circuits (FIG. 2) and storage circuits (FIG. 3*a*) including "latching" circuits.

The details of a pair of these emitter-coupled logical circuits, as provided on a single "chip," are shown in FIG. 3*b* and the package therefor is shown in FIG. 3*c*. The transfer characteristic curve for any one of these circuits is shown in FIG. 3*d* and also a sense signal output S*o* to demonstrate the operation of the circuit as a threshold circuit for sense signals (e.g., sense signal output S*o* for bit "1").

The emitter-coupled logical gating circuits are basically a differential amplifier circuit. It is, however, operated in a switching mode by applying inputs in such a manner that one or the other of the two transistors 70 and 71 is always "turned-off." In FIG. 3*b*, a logic input is applied to input 72. For this circuit, a higher logical level (—0.8 v.) represents a "1" bit, and a lower logical level (—1.6 v.) represents a "0" bit. The reference voltage $V_b$ is therefore set half-way between these values (—1.2 v.).

Thus, when input 72 is at the upper level (—0.8 v.), for example, the reference transistor 71 is "turned-off" and current flows through input transistor 70 lowering its collector voltage level (—0.8 v.). Output emitter-follower transistor 73 produces a voltage drop (0.8 v.), lowering the NOR output to the lower level (—1.6 v.). Similarly, no current flows in the collector resistor for transistor 71 on the reference side and its collector voltage is at 0 v., and OR output is at the high logical level (—0.8 v.).

By connecting other input transistors 74, 75 and 76 in parallel with input transistor 70, a logical gating circuit is formed which produces the logical OR function at the OR output and the logical NOR function at the NOR output. In this configuration, if any one of the logical inputs is at the higher logical level (—0.8 v.), the OR output will be at the higher level (—0.8 v.) and the NOR output will be at the lower level (—1.6 v.). If all four inputs are at the lower level, OR output will be at the lower level (—1.6 v.), and NOR output will be at the higher level (—0.8 v.).

The operation of these logic gates can be summarized by means of the transfer characteristic curve shown in FIG. 3*d*. The operation of this logical gating circuit of FIG. 3*c* as a threshold circuit is evident from the following discussion. Any excursion of voltage at any one of the logic inputs (e.g., input 72) which does not pass the knee 77 of the curve (FIG. 3*d*) will produce negligible change in voltage at the outputs. In order to change the voltage at the outputs to the opposite logical levels, a voltage of 0.6 v. needs to be traversed in the operation of this circuit.

While only a single sense-digit line 30, sense amplifier SA1, digit driver DR1, and digit storage circuit M1 are shown for the first digit of the words of the memory, it is evident that the corresponding circuits for each of the other digits of the word (e.g., 36 digits) are identical in every respect and have not been shown to simplify the explanation of the sense-digit circuitry of the memory. It is important to note that the present memory provides for improved direct current stability resulting from the use of a plurality of circuits on a single "chip" or silicon substrate for sense amplifier SA1, for example. It is of particular importance to provide stability with respect to both sides of a differential amplifier to avoid complex adjustments, especially with regard to temperature coefficients where only compromises result from adjustments for different temperature coefficients. Accordingly, it is an important advantage of the present invention to be able to utilize monolithic integrated circuitry for various circuits and particularly in the sense amplifiers in order to provide improved performance over prior circuits employing discrete or separate hybrid circuits for individual portions of the memory circuits where stability becomes such an important factor in the operation at high speeds and low signal levels. Further, the circuit arrangements of the present memory not only provide for superior operation, but also eventual lower cost of integrated circuits over discrete circuits. Also, the present invention, by novel circuit arrangement, has provided for the use of integrated circuits and appropriate power level changing where required to supply the currents required for driving word lines, as discussed in the earlier description of FIG. 1.

In the light of the above teachings, various modifications and variations of the present invention are contemplated and will be apparent to those skilled in the art without departing from the spirit and scope of the invention.

What is claimed is:

1. A magnetic thin film memory comprising: an array of magnetic rods, each of said magnetic rods comprising a conductor having a circumferential, anisotropic magnetic thin film surface; a plurality of word lines, each being inductively coupled to the thin film surface of a plurality of said magnetic rods to provide a plurality of word locations including a plurality of digit storage positions for each word location; linear selection circuit means for selecting any one of said word lines for accessing digit storage positions of a selected word by causing a word current to be produced in the selected word line, said selection circuit means including a line transistor individual to each word line and a diode coupling said transistor to a common line for said word lines; and constant current circuit means coupled to said common line for supplying a constant current to any selected one of said word lines, said constant current circuit means comprising the combination of a constant current transistor circuit and an inductor supplying a constant current through said inductor to said common line and to any one of said word lines upon selection thereof.

2. The magnetic thin film memory according to claim 1 in which said line transistor comprises an npn transistor having a collector, base and emitter, and wherein said collector is connected to said word line and said emitter is connected to said diode for conducting said word current from the selected word line to said common line.

3. The magnetic thin film memory according to claim 2 in which said linear selection circuit means further includes driver circuit means coupled to said base for selectively producing base-emitter current causing said line transistor of the selected word line to be driven into a state of saturation to produce said word current.

4. The magnetic thin film memory according to claim 1 in which said linear selection circuit means further includes dummy-load circuit means coupled to said common line and normally passing said constant current, and means coupled to said dummy-load circuit means for causing the blocking of current therethrough upon selection of any word line coupled to said common line and said constant current circuit means.

5. The magnetic thin film memory according to claim 1 in which said linear selection circuit means includes a plurality of column driver circuits coupled to respective ones of said transistors and a row driver circuit coupled to said common line means for selectively causing any selected pair of column and row drivers to be activated to drive a corresponding one of said line transistors into saturation and cause said constant current circuit means to produce a constant word current in the respective word line.

6. In a magnetic thin film memory, the combination comprising: an array of magnetic rods, each of said magnetic rods comprising a conductor having a circumferential, anisotropic magnetic thin film surface thereon; a plurality of word lines, each being inductively coupled to the thin film surface of a plurality of said magnetic rods to provide a plurality of word locations including a plurality of digit storage positions for each word location; a plurality of word driver circuit means, each of said word driver circuit means including means coupling said plurality of said word lines thereto for providing linear selection of one of said word lines to produce word current in a selected word line for accessing a plurality of digit positions of a corresponding one of said word locations; logical circuit means including decoding circuit means, said decoding circuit means comprising monolithic integrated circuit means having a plurality of pairs of first and second outputs, each pair providing first and second logical voltage level output signals of only a low power level; a plurality of power level changing circuit means coupling said decoding circuit means to respective ones of said driver circuit means for selective operation of the driver circuit means, each of said power level circuit means comprising a differential amplifier circuit having first and second inputs coupled to a respective pair of said first and second logical outputs for producing differential amplification of said first and second logical signals to provide high power level signals for selectively operating said word driver circuits for said selection of any word line.

7. The combination according to claim 6 in which said plurality of word driver circuit means comprises a plurality of first and a plurality of second word driver circuit means coupled to said word lines to provide for operation of any combination of one first and one second word driver circuit means for linear selection of any one of said word lines.

8. The combination according to claim 7 in which each of said word lines includes a transistor having a collector, base and emitter, and said plurality of first word driver circuit means are coupled to the bases of said transistors and said plurality of second word driver circuit means are connected to the emitters of said transistors.

9. The combination according to claim 6 in which each of said word driver circuit means comprises an amplifier circuit including an amplifier transistor having a collector, base and emitter and an emitter-follower circuit coupled to said collector, and said differential amplifier comprises first and second transistors and a diode, each of said first and second transistors having a collector, base and emitter wherein said collector of said first transistor is coupled to the base of said amplifier transistor and a common current supply cource which is not capable of supplying adequate collector current to said first transistor during conduction, and wherein said diode couples the collector of said second transistor to the collector of the first transistor to conduct current to said first transistor during conduction of the latter.

10. The combination of claim 6 in which said magnetic thin film surface on said magnetic rods comprises spaced sections of magnetic thin film wherein the area between sections is substantially devoid of said magnetic thin film to inhibit magnetic interaction between sections.

11. In a magnetic thin film memory, the combination comprising: an array of magnetic rods, each of said magnetic rods comprising a conductor having a circumferential, anisotropic magnetic thin film surface thereon; a plurality of word lines, each being inductively coupled to the thin film surface of a plurality of said magnetic rods to provide a plurality of word locations including a plurality of digit storage positions for each word location; word driver circuit means coupled to said plurality of word lines for selectively producing word current in said word lines for both reading-out and writing digits in said word locations; sense-digit circuit means including sense amplifier circuit means coupled to a plurality of said conductors for producing differential amplification of signals representing digits produced during reading-out of said digits, said sense amplifier comprising differential amplifier circuit means including a plurality of transistors formed on a single type of monolithic circuit substrate to provide differential amplification and common mode noise rejection; and threshold detector circuit means coupled to said differential amplifier for detecting said signals exceeding a predetermined amplitude, said threshold detector circuit means comprising emitter-coupled logical circuit means, including a differential amplifier formed on a single type of monolithic integrated circuit substrate.

12. A magnetic memory comprising an array of magnetic rods arranged in rows and columns, each of said rods comprising a conductor having a circumferential anisotropic magnetic thin film on at least portions of its surface; a plurality of word lines each of which is inductively coupled to the thin film on a respective one of the portions of each of a plurality of the rods in a row, the portions of thin film coupled by each said word line comprising the digit storage positions of a corresponding word storage position; means for supplying word current; linear selection circuit means for selecting any one of the word lines for accessing the digit storage position corresponding to the selected word line by applying a word current to that selected word line, said selection means including individual semiconductor switching means coupled to said word lines and selectively operated to apply said word current to the selected word line, and individual semiconductor means coupling said switching means for each row to said word current means to unidirectionally conduct said word current between said switching means and word current means.

13. A magnetic memory comprising an array of magnetic rods arranged in rows and columns, each of said rods comprising a conductor having a circumferential anisotropic magnetic thin film on at least portions of its surface; a plurality of word lines each of which is inductively coupled to the thin film on a respective one of the portions of each of a plurality of the rods in a row; the portions of thin film coupled by each said word line comprising the digit storage positions of a corresponding word storage position; linear selection circuit means for selecting any one of the word lines for accessing the digit storage position corresponding to the selected word line by applying a word current to that line; and constant current circuit means for supplying said word current, said constant current means comprising a constant current transistor circuit having an inductor as part of its load circuit such that a substantially constant word current is provided by the constant current means to the selected word line.

References Cited

UNITED STATES PATENTS

| | | | |
|---|---|---|---|
| 3,195,108 | 7/1965 | Franck | 340—146.2 |
| 3,241,127 | 3/1966 | Snyder | 340—174 |
| 3,283,313 | 11/1966 | Hathaway | 340—174 |
| 3,341,829 | 9/1967 | Meier | 340—174 |
| 3,378,823 | 4/1968 | Kaufman et al. | 340—174 |
| 3,408,639 | 10/1968 | Nakamura | 340—174 |

RAULFE B. ZACHE, Primary Examiner

U.S. Cl. X.R.

340—174